US012692729B2

(12) United States Patent
Inan et al.

(10) Patent No.: US 12,692,729 B2
(45) Date of Patent: Jul. 28, 2026

(54) MOTOR VEHICLE LOCK

(71) Applicant: KIEKERT AKTIENGESELLSCHAFT, Heiligenhaus (DE)

(72) Inventors: Ömer Inan, Dorsten (DE); Holger Schiffer, Meerbusch (DE); Peter Szegeny, Engelskirchen (DE); Andreas Schmitz, Velbert (DE); Michael Scholz, Essen (DE); Andreas Ziganki, Mettmann (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 33 days.

(21) Appl. No.: 18/851,377

(22) PCT Filed: Feb. 28, 2023

(86) PCT No.: PCT/DE2023/100157

§ 371 (c)(1),
(2) Date: Sep. 26, 2024

(87) PCT Pub. No.: WO2023/193840

PCT Pub. Date: Oct. 12, 2023

(65) Prior Publication Data

US 2025/0223846 A1 Jul. 10, 2025

(30) Foreign Application Priority Data

Apr. 4, 2022 (DE) ..................... 10 2022 107 990.2

(51) Int. Cl.

| | |
|---|---|
| ***E05B 77/34*** | (2014.01) |
| ***E05B 81/04*** | (2014.01) |
| ***E05B 85/02*** | (2014.01) |

(52) U.S. Cl.
CPC .............. *E05B 77/34* (2013.01); *E05B 81/04* (2013.01); *E05B 85/02* (2013.01)

(58) Field of Classification Search
CPC .......... E05B 77/34; E05B 81/04; E05B 81/54; E05B 85/02; E05B 79/02; E05B 79/04
See application file for complete search history.

(56) References Cited

U.S. PATENT DOCUMENTS 5,640,807 A * 6/1997 Shigematsu ............ E05B 81/20 49/449
5,746,076 A 5/1998 Inoue
(Continued)

FOREIGN PATENT DOCUMENTS

DE 4306143 A1 9/1994
DE 19622028 A1 12/1996
(Continued)

OTHER PUBLICATIONS

International Search Report mailed Jun. 6, 2023, for priority International Application No. PCT/DE2023/100157.

*Primary Examiner* — Christine M Mills
*Assistant Examiner* — Christopher F Callahan
(74) *Attorney, Agent, or Firm* — Renner, Otto, Boisselle & Sklar, LLP

(57) ABSTRACT

A motor vehicle lock has a locking mechanism with a rotary latch and at least one pawl, an electric drive and a gear mechanism arranged downstream of the electric drive, a lock housing with at least one housing cover, a cover cap and a housing shell, wherein at least one dry space can be formed in the lock housing by means of the housing cover and the cover cap, and a printed circuit board arranged in the dry space, wherein at least one electrical contact from the printed circuit board to the electric drive can be provided, and wherein the electrical contact between the printed circuit
(Continued)

board and the electric drive can be arranged in the housing cover.

16 Claims, 3 Drawing Sheets

(56) References Cited

U.S. PATENT DOCUMENTS

| | | | | |
|---|---|---|---|---|
| 2015/0145327 | A1* | 5/2015 | Barmscheidt .......... | H05K 3/222<br>307/10.2 |
| 2015/0361694 | A1* | 12/2015 | Zeabari .................. | E05B 81/54<br>361/752 |
| 2018/0245379 | A1* | 8/2018 | Taurasi .................. | H05K 5/069 |

FOREIGN PATENT DOCUMENTS

| | | | |
|---|---|---|---|
| DE | 10259465 | A1 | 7/2003 |
| DE | 202005015588 | U1 | 12/2005 |
| DE | 102009027415 | A1 | 1/2011 |
| DE | 102015109494 | A1 | 12/2015 |
| DE | 112014004455 | T5 | 6/2016 |
| DE | 102021119652 | A1 | 7/2021 |
| EP | 2754799 | A1 | 7/2014 |
| WO | 2010136004 | A1 | 12/2010 |
| WO | 2015044323 | A1 | 4/2015 |

* cited by examiner

MOTOR VEHICLE LOCK

This application is a national phase of International Patent Application No. PCT/DE2023/100157 filed Feb. 28, 2023, which claims priority to German Patent Application No. 10 2022 107 990.2 filed Apr. 4, 2022, each of which is hereby incorporated herein by reference in its entirety.

FIELD OF DISCLOSURE

The invention relates to a motor vehicle lock, in particular a motor vehicle side door lock, having a locking mechanism with a rotary latch and at least one pawl, an electric drive, in particular an electric motor, and a gear mechanism arranged downstream of the electric motor, a lock housing with at least one housing cover, preferably a lock housing with a cover cap and a housing shell, wherein at least one dry space can be formed in the lock housing, and a printed circuit board arranged in the dry space, wherein at least one electrical contact from the printed circuit board to the electric drive can be provided.

BACKGROUND OF DISCLOSURE

Locks for motor vehicles are used where movable components on the motor vehicle, such as doors, flaps, covers and/or sliding doors, must be held or secured in position. The locks have the primary task of holding the moving component securely in position even during an extreme situation and thus protecting the operator or user of the motor vehicle from injury. Such locks are also used in regions that are subject to environmental influences and can therefore come into contact with moisture, dust and/or other environmental influences.

In particular, the region of the locking mechanism comes into contact with moisture or can even be directly affected by wetness. In addition to the pure securing function of holding the movable part, the lock now faces more and more further tasks. In addition to the pure mechanical holding of the movable part, the lock can also contain electronics, which are particularly susceptible to moisture. The electronics can, for example, be used to control a motor arranged in the motor vehicle lock and to supply it with the appropriate electrical power, or switching means can be contained in the motor vehicle lock, wherein the positions of functional components in the motor vehicle lock can be queried by means of the switching means, for example.

DE 10 2009 027 415 A1 discloses a lock for a motor vehicle that offers protection against outer influences such as dust, moisture or manipulation. In this case, a lock has a lock housing and a housing cover for the lock housing, wherein a circumferential slot remains between the lock housing and the cover through which moisture can penetrate into the lock. In order to protect the components of the lock in the interior, it is proposed to wrap the lock at least partially several times with an adhesive film in order to protect the lock reliably and permanently from outer influences.

In order to protect the printed circuit board and/or other electronic components in the motor vehicle lock from penetrating moisture, the motor vehicle lock can be divided into a dry region and a wet region. Such a lock is known, for example, from EP 2 754 799 A1. The printed circuit board and the other electronic components are located between a cover cap and a lock cover such that they are sealed off from moisture.

In addition to the influence of direct moisture, the motor vehicle lock is also subject to strong temperature fluctuations. Motor vehicle locks must cover temperature ranges from −40° C. to +80° C. in order to function properly in all climates. However, temperature influences can have an impact on air humidity and, in particular in the case of large temperature fluctuations, moisture can escape from the air, so that the electronic components can be affected by moisture.

DE 102 59 465 A1 discloses an actuating drive in which pressure differences occur in the interior of the actuating drive due to the movement of the actuating means. The actuating drive can likewise be arranged in the wet region of a motor vehicle, so that the internal parts, as well as the actuating means, must be tightly sealed. In order to compensate for these pressure differences and at the same time prevent moisture from entering the interior of the actuating drive, the publication proposes providing a venting bore that is moisture-tight and at the same time permeable to air. For this purpose, a membrane is inserted into the venting bore; pressure compensation can occur through the membrane, but at the same time the membrane is made of a semi-permeable plastics material that prevents the ingress of moisture.

The unpublished DE 10 2021 119 652.3 discloses a lock for a lock for a motor vehicle, comprising a locking mechanism with a rotary latch and at least one pawl, a lock housing with at least one housing cover, a printed circuit board arranged in an interior of the lock housing, wherein the printed circuit board is arranged in a dry space separated from the locking mechanism. By separating the printed circuit board, the electronics can be protected from moisture.

The electronic and electrotechnical components, such as motors and circuit boards, must be protected from moisture as described above in order to ensure full functionality over the service life of the motor vehicle. The solutions mentioned above have generally proven successful, but can be improved. In particular, the connection of the electric drives is critical, since the contacting conductor tracks may be exposed, at least in some regions. If the conductor track is directly connected to a printed circuit board, the electrical contact must be ensured on the one hand and the printed circuit board must be protected from moisture on the other hand. Overall, the constructive solutions have not been convincing so far. This is where the invention starts.

SUMMARY OF DISCLOSURE

The object of the invention is to provide an improved constructive solution for contacting an electric drive. In particular, it is an object of the invention to provide a structurally simple and secure seal of the connection between the electric drive and the printed circuit board.

According to the invention, the object is achieved by the features of independent claim 1. Advantageous embodiments are specified in the dependent claims. However, it should be noted that the exemplary embodiments described in the following are not limiting; rather, any number of possible variations of the features described in the description, the claims, and the drawings are possible.

According to the claim, the object of the invention is achieved in that a motor vehicle lock, in particular a motor vehicle side door lock, is provided, having a locking mechanism with a rotary latch and at least one pawl, an electric drive, in particular an electric motor and a gear mechanism arranged downstream of the electric motor, a lock housing with at least one housing cover, preferably a lock housing with a cover cap and a housing shell, wherein at least one dry space can be formed in the lock housing, and a printed circuit board arranged in the dry space, wherein at least one electrical contact from the printed circuit board to the electric drive can be provided and wherein the electrical contact between the printed circuit board and the electric drive can be arranged in the housing cover. The design according to the invention of the motor vehicle lock creates the possibility of arranging the electrical contact between the printed circuit board and the electric drive in the motor vehicle lock in such a way that a sealing connection between the electric drive and the printed circuit board can be realized. To realize the sealing connection, the housing cover is substantially used here. The housing cover thus has a multifunction. On the one hand, the housing cover is used to seal and/or cover the lock housing and, on the other hand, the housing cover is used according to the invention as a carrier for the conductor tracks. The sealing feedthrough is therefore provided by the housing cover. This provides an improved possibility for the realization of a dry space and results in further design freedom for the developer of the motor vehicle lock.

If reference is made to a lock for a motor vehicle in the sense of the invention, this includes all locking systems used to hold a movable part in the motor vehicle. These locking systems have a locking mechanism with a rotary latch and at least one pawl, wherein the rotary latch can be brought into engagement with a lock holder and the pawl can hold the rotary latch in at least one ratchet position. Such a lock can be used, for example, in a side door, a flap, a hood and/or a sliding door, to name just a few examples of the use of the motor vehicle lock according to the invention.

If the motor vehicle lock is used, for example, in a side door, two ratchet positions are specified in the locking mechanism. When the side door is being closed, the locking mechanism passes first into a pre-ratchet position and, for complete closing, into a main ratchet position. In this case, the rotary latch can be secured in the ratchet position by means of a pawl or a pawl and a blocking or locking lever, depending on whether a closing or opening moment occurs in the locking mechanism. The locking mechanism is mounted in the motor vehicle lock on a metal lock case and can additionally be secured in the axle receptacles by means of a reinforcement plate.

In order to protect the locking mechanism and the further functional components contained in the motor vehicle lock from dirt and/or moisture and to provide receptacles or storage locations for the functional components of the lock, the lock has a lock housing with at least one housing cover. In addition to the housing cover, there may be a cover cap in the lock, in particular in cases where there are weather-sensitive components in the motor vehicle lock. This cover cap then has the task of forming a wet region and a dry region in the motor vehicle lock. As a result, there is the possibility of arranging the wetness- or moisture-sensitive parts separately in the motor vehicle lock and providing additional safety in the motor vehicle lock. Such moisture-sensitive components include, for example, electronic components, a printed circuit board or an electric motor. These parts located in the interior of the lock housing are particularly moisture-sensitive, since a moisture intrusion can impair the functionality of these parts. In principle, however, it is possible to create a dry space using a lock housing and a lock cover.

The printed circuit board is arranged in a dry space that is at least separated from the locking mechanism. The dry space is characterized by the fact that at least no direct moisture can penetrate into the dry space. According to the invention, the dry space for accommodating the printed circuit board can be formed by a cover cap as an intermediate layer and the housing cover. In addition, there may also be further dry spaces in the motor vehicle lock. In addition to the dry space for the printed circuit board, there can be a dry space for, for example, an electric drive, a microswitch, i.e., electrical or electronic components, but the further dry space can also contain, for example, a gear mechanism arranged downstream of the electric drive.

Advantageously and in an embodiment variant of the invention, the housing cover has a separating joint, wherein the separating joint forms at least a part of a dry space boundary. The separating joint forms a sealing surface between the dry space for the printed circuit board and the electrical component(s) connected to the printed circuit board. While the contacting of the electric drive with the printed circuit board has mostly been described above, it is of course also conceivable according to the invention that there is a plurality of electrical contacts between the printed circuit board and the electrical components through the separating joint. In other words, a plurality of electrical contacts can be guided through the separating joint and extend through the separating joint in the housing cover. The separating joint can then engage with, for example, a seal on the cover plate, so that a dry space can be formed. What is substantial to the invention is that the electrical contact extends through the housing cover, wherein the electrical contacts come into contact with the printed circuit board on the one hand and with the electrical components on the other hand. The electrical contact thus extends through the separating joint.

If the electrical contact can be held in the housing cover, in particular in a form-fitting manner, a further embodiment variant can be realized, which in turn has an independent significance. By holding the electrical contact in the housing cover, the installation of the housing cover can be made easier. In addition, the secure fixing or holding of the electrical contact ensures that proper contact can be made between the printed circuit board and the electric drive or the electrical components when the cover is installed. The form fit can be achieved, for example, via locking elements so that the electrical contact can be securely and firmly held in the housing cover. The electrical contacts can be inserted into the housing cover as conductor track strips and/or as conductor track structures.

It may also be advantageous and represent a further embodiment variant of the invention if the electrical contact extends through an opening in the housing cover, in particular an opening in the region of the separating joint. If an opening is made in the housing cover through which the electrical contact extends, an inexpensive and effective sealing of the feedthrough for the electrical contact is possible. The opening is preferably located in the region of the separating joint of the cover and is accessible from an outer surface of the motor vehicle lock and the housing cover. If the electrical contacts are mounted in the housing cover and, for example, held in the housing cover in a form-fitting manner, the electrical contacts are visible through the opening. Even if only one opening is described here, it is of course also conceivable that if there is a plurality of electrical contacts on the printed circuit board to electrical components, there are also two or more openings in the housing cover.

The openings extend, at least in some regions, toward an outer surface of the lock housing. The openings are therefore visible from the outside when the motor vehicle lock is in the closed state, so that on the one hand it is possible to check the correct position of the electrical contact, and at the same time the electrical contact to, for example, the electric drive and/or the printed circuit board can be checked. This combines the advantage of a secure feedthrough of the electrical contact through the housing cover with the possibility of checking the functional reliability and the fit of the electronic contact.

It is also advantageous, and a further embodiment variant, if the opening can be filled by means of a sealing compound. The opening can be easily closed from the outside. In this case, the sealing compound can, for example, be introduced into the opening in liquid and/or viscous form in order to securely seal the passage between the dry space and the electric drive or the electrical component. This provides a simple structural means to provide a sealing feedthrough through the housing cover.

To fill the separating joint, it may be advantageous if there is an opening in the housing cover, as described above. However, it is also conceivable for the opening in the lid to be omitted and the separating joint below the housing cover to be eliminated. The separating joint can be arranged in a lock housing cavity, i.e., a filling region surrounding the separating joint, so that a casting trough is provided for filling.

In a further embodiment variant of the invention, a resilient seal is arranged in the housing cover, wherein in particular the electrical contact extends through the seal. In this embodiment variant, which can of course also be combined with further solutions for sealing the electrical contact, the seal is, for example, inserted into the housing cover or, for example, materially integrally formed with the housing cover as a two-component part. Therefore, the electrical contact can be inserted into the housing cover, which directly creates a sealing connection. The electrical contact can be formed in such a way that, for example, electrical contacts extend from the printed circuit board, which reach through the seal in the cover and contact the electrical conductor tracks or the electrical contact so that the seal is provided in the region of the protruding contact lugs on the printed circuit board. However, it is also conceivable that the electrical contacts or conductor tracks in the housing cover extend through the seals present in the housing cover. One, two or more seals can be provided through which the conductor tracks are passed, but it is also conceivable that there is only one seal that seals the electrical contact in the housing cover.

The resilient seal can advantageously be arranged in the dry space itself. In this variant of the invention, the resilient seal is located on the housing cover, for example, in such a way that the electrical contact extends through the seal or, for example, contact lugs are present on the printed circuit board in the dry space, which extend through the seal in the housing cover. In any case, the resilient seals make it possible to achieve a sealing electrical contact by means of the conductor tracks in the housing cover.

By injection molding the electrical contact into the housing cover according to the invention, an additional and independent embodiment variant of the invention can be provided. In this case, the housing cover carries the electrical conductor tracks or the electrical contacts, wherein the conductor tracks are injection molded into the housing cover directly during the production of the housing cover. This allows secure sealing to be achieved directly during the production of the housing cover.

If electrical contact is referred to within the meaning of the invention, this comprises electrical conductor tracks, for example in the form of stamped grids and/or as individual conductor sheet strips. The electrical contact is therefore not limited to an individual conductor track, but can also be designed as a combined conductor track structure, for example.

It can be advantageous if the conductor track can be connected to the printed circuit board by means of an insulation displacement connection. This embodiment variant results in an advantageous, easy-to-contact solution that ensures secure contact with the conductor track. In particular, when the insulation displacement connection extends in the direction of the cover, the clamping contact lugs can ensure secure contact with the conductor track. It is also possible to easily create a sealing connection through, for example, a resilient seal using the clamping contact lugs. Preferably, the electrical contact or the conductor track is realized away from the printed circuit board toward an electric drive, in particular an electric motor. This makes it possible to provide a structurally inexpensive and sealing means for contacting the electric motor.

In addition to connecting the printed circuit board via insulation displacement connections, it is also conceivable to contact the conductor tracks via spring-loaded contacts. The spring-loaded contacts can then be arranged on the printed circuit board, for example, so that the conductor tracks engage with the spring contacts when inserted or installed.

BRIEF DESCRIPTION OF DRAWINGS

In the following, the invention is explained in more detail with reference to the accompanying drawings on the basis of exemplary embodiments. However, the principle applies that the exemplary embodiments do not limit the invention, but are merely embodiments. The features shown can be implemented individually or in combination with further features of the description as well as the claims, individually or in combination.

In the figures.

DETAILED DESCRIPTION

Figure 1:
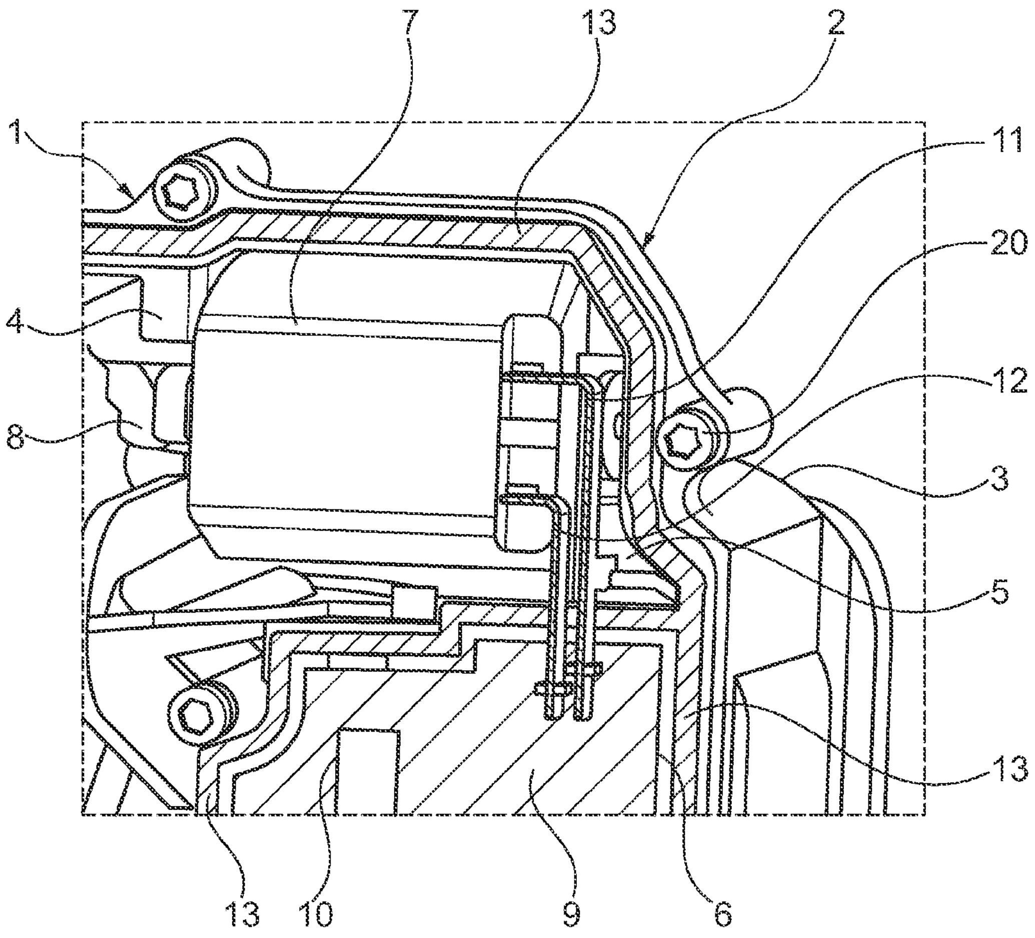
FIG. 1 is a three-dimensional view of a motor vehicle lock in the region of an electric drive and a dry region, wherein an electrical contact between the printed circuit board and the electric drive is additionally shown detached from a housing cover.

FIG. 1 is a three-dimensional view of a partial region of a motor vehicle lock 1 in an open representation. The lock housing consisting of a housing shell 3 and a cover cap can be seen. The cover cap 4 forms an intermediate layer in the housing shell 3 so that a first and second dry space 5, 6 can be formed. An electric drive with a downstream gear mechanism 8 is arranged in the first dry space 5. In the second dry space 6 there is a printed circuit board 9 on which electronic components 10 can be arranged. The electric drive 7 is connected to the printed circuit board 9 via conductor tracks 11, 12. FIG. 1 shows the motor vehicle lock 1 with a circumferential seal 13 arranged on the housing shell 3. The circumferential seal 13 protects the motor vehicle lock 1 from outer influences, but also separates the dry spaces 5, 6. The present motor vehicle lock 1 is thus equipped with at least two dry spaces 5, 6.

Figure 2:
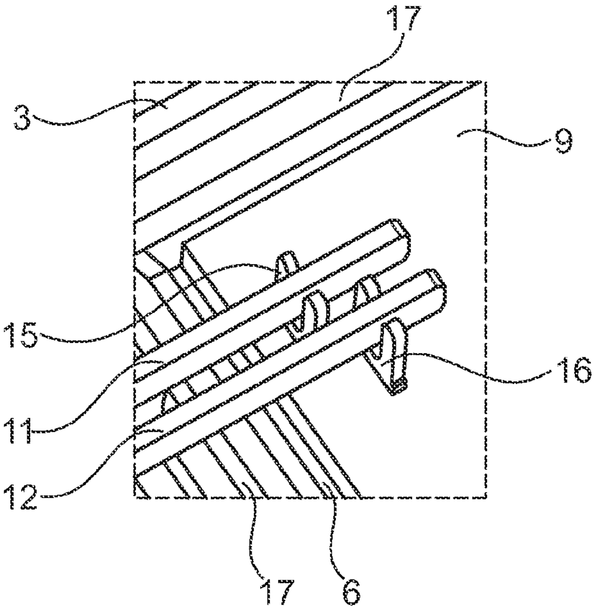
FIG. 2 is a detailed view of an electrical contact.

In FIG. 1, the conductor tracks 11, 12 are shown as electrical contacts 11, 12 detached from a housing cover 14 (not shown). The electrical contact 11, 12 connects the electric motor 7 to contacts 15, 16 on the printed circuit board 9. The electrical contact of the conductor tracks 11, 12 with the printed circuit board 9 is shown in an enlarged and three-dimensional representation in FIG. 2. The electrical contact of the conductor tracks 11, 12 is made via terminal contacts 15, 16 on the printed circuit board 9. In other words, the electrical contacting of the conductor tracks 11, 12 with the printed circuit board 9 is carried out by inserting the conductor tracks 11, 12 into the insulation displacement contacts 15, 16. As explained above, it is also conceivable to connect the conductor tracks 11, 12 to the printed circuit board 9 via bent, resilient spring contacts. FIG. 2 also shows a sealing joint 17, wherein a resilient sealing means 13, for example, can be inserted into the joint 17 in a form-fitting manner.

Figure 3:
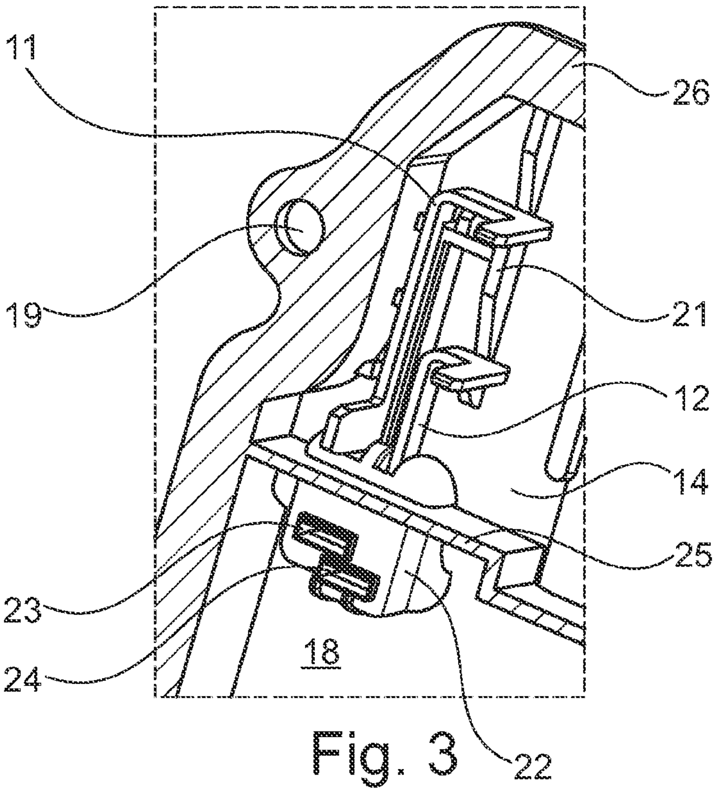
FIG. 3 shows an electrical contact inserted into the housing cover, wherein an additional opening is formed in the housing cover.

FIG. 3 is a three-dimensional view of the housing cover 14 and a view of an interior 18 of the housing cover 14. The housing cover 14 can be connected to the lock housing 2 or the housing shell 3 via recesses 19 that correspond to or interact with screws 20. It is of course also conceivable that the housing cover 14 can be connected to the lock housing 2 by means of clips and/or locking connections and/or screws 20.

FIG. 3 shows the conductor tracks 11, 12, wherein the conductor tracks 11, 12 are inserted into the lock cover 14. The lock cover 14 has ribs 21, by means of which the conductor tracks 11, 12 are held in a form-fitting manner in the housing cover 14. The conductor tracks 11, 12 are inserted in some regions into a recess 22 in the housing cover 14, wherein the conductor tracks 11, 12 extend into a region of slot-shaped openings 23, 24. The conductor tracks 11, 12 can be connected to the contacts 15, 16 on the printed circuit board 9 via the slots 23, 24. The conductor tracks 11, 12 thus bridge a separating joint 25 that is molded into the housing cover 14 or can be formed integrally with the housing cover 14. FIG. 3 also shows a contact surface 26 that acts as a sealing surface toward the seal 13. In this case, the separating joint 25 is also formed in such a way that the separating joint 25 also rests on the seal 13 so that the dry spaces 5, 6 can be insulated by means of the separating joint 25.

Figure 4:
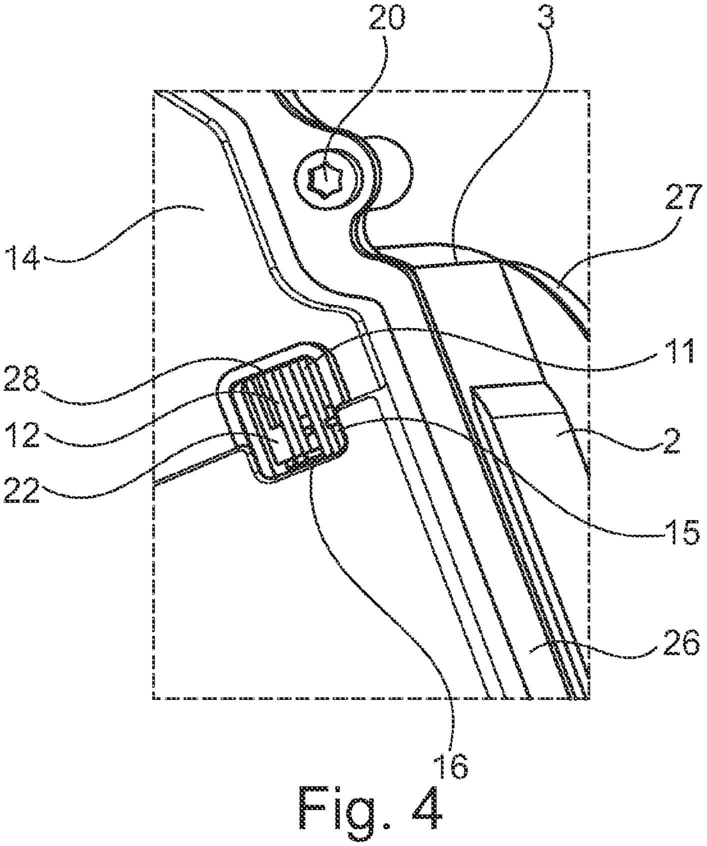
FIG. 4 is a plan view of the housing cover according to FIG. 3 in a plan view of the motor vehicle lock housing.

In FIG. 4, the housing cover 14 shown in FIG. 3 can be seen in a position mounted on the lock housing 2. In some regions, a lock case 27 can also be seen, wherein a locking mechanism bearing for the motor vehicle lock can be provided by means of the lock case 27. An opening 28 and the recess 22 can be clearly seen in FIG. 4. The conductor tracks 11, 12 and the contacts 15, 16 can be seen through the opening 28. In this way, a secure contact between the conductor tracks in the motor vehicle lock and with the electrical contacts 15, 16 can be ensured and at the same time a means for checking the electrical contact between conductor tracks 11, 12 and contacts 15, 16 can be provided. After the housing cover is installed and it is checked that the conductor tracks 11, 12 are completely and correctly contacted, the opening 28 can then be closed by means of a plug or a liquid sealant or a hardening sealant.

Figure 5:
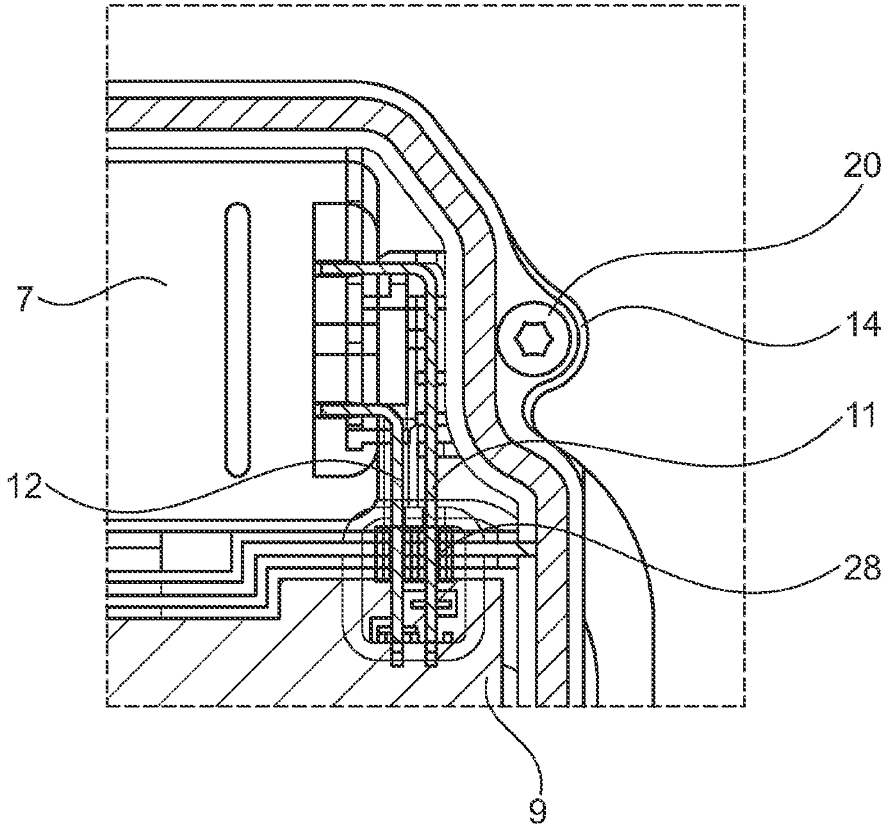
FIG. 5 is a transparent representation of the embodiment according to FIG. 4 with an opening in the housing cover.

FIG. 5 shows the assembled state according to FIG. 4 with a transparent housing cover 14. The conductor tracks 11, 12 can be seen, wherein the conductor tracks 11, 12 supply the electric motor 7 with electrical energy via the printed circuit board 9. In the case of the use of a lock housing cover 14 carrying the conductor tracks 11, 12, the conductor tracks 11, 12 are first inserted into the housing cover 14 and held there in a force-fitting, form-fitting or materially integral manner. Only after the conductor tracks 11, 12 have been inserted into the housing cover is the housing cover 14 connected to the lock housing 2 so that electrical contact is made with the electric drive 7. After the cover 14 has been installed using the screws 20, a visual check of the electrical contact with the printed circuit board 9 is carried out and finally the opening 28 is filled or sealed.

Figure 6:
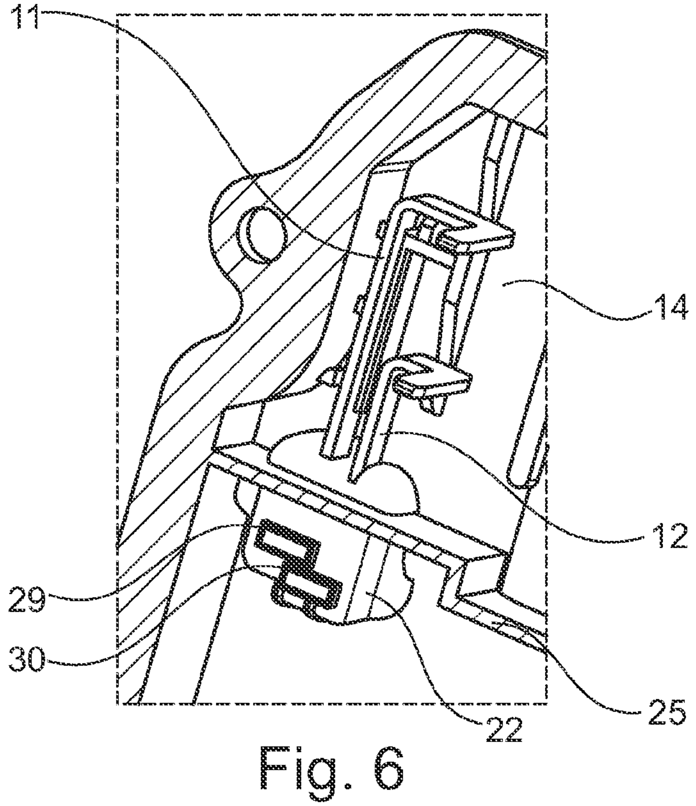
FIG. 6 shows an alternative embodiment as a combination of a seal by means of an opening and a resilient seal.

FIG. 6 shows an alternative embodiment as a combined seal of the electrical lines 11, 12. Identical components are provided with the same reference signs. The conductor tracks 11, 12 are also inserted into the housing cover 14 and held there, in accordance with the exemplary embodiment described above. In addition to the sealing option by means of the recess 22 in the housing cover 14, additional seals 29, 30 are arranged in the region of the slots 23, 24 in the lock cover 14. Thus, an additional seal can be provided, which in turn ensures the tightness with respect to the printed circuit board 3 and the dry space 6. The design according to the invention of the lock housing 2, 3, 14 makes it possible to provide improved contact of the electric drive 7 from a dry space to the electric drive. In particular, it is possible to provide electrical contact in a dry space 6, wherein functional reliability can be ensured by safety measures in the form of a visual inspection.

LIST OF REFERENCE SIGNS

1 Motor vehicle lock
2 Lock housing
3 Housing shell
4 Cover cap
5, 6 Dry space
7 Electric drive
8 Gear mechanism
9 Printed circuit board
10 Electronic components
11, 12 Conductor track, electrical contact
13 Seal
14 Housing cover
15, 16 Contacts
17 Sealing joint
18 Interior of the housing cover
19 Recess
20 Screw
21 Rib
22 Recess
23, 24 Slots
25 Separating joint
26 Contact surface
27 Lock case
28 Opening
29, 30 Seal

The invention claimed is:

1. A motor vehicle lock comprising:

a locking mechanism with a rotary latch and at least one pawl, an electric drive comprising an electric motor and a gear mechanism arranged downstream of the electric motor, a lock housing comprising at least one housing cover, a cover cap, and a housing shell, wherein the housing shell includes a seal that defines a first dry space and a second dry space, and a printed circuit board arranged in the second dry space and the electric drive is arranged in the first dry space, wherein at least one electrical contact from the printed circuit board is connected to the electric drive, and wherein the electrical contact between the printed circuit board and the electric drive is arranged in the housing cover, wherein the housing cover has a separating joint, wherein the separating joint forms at least part of a dry space boundary between the first and second dry spaces by engaging the seal.

2. The motor vehicle lock according to claim 1, wherein the electrical contact extends through the separating joint.

3. The motor vehicle lock according to claim 1, wherein the electrical contact is injection molded in the housing cover.

4. The motor vehicle lock accordingly to claim 1, wherein the separating jointed is arranged in a cavity in the lock housing, the cavity being a filling region for receiving a sealing compound.

5. The motor vehicle lock according claim 1, wherein the electrical contact is held in the housing cover in a form-fitting manner.

6. The motor vehicle lock accordingly to claim 5, further comprising locking elements that secure the electrical contact to the housing cover in the form-fitting manner.

7. The motor vehicle lock according to claim 1, wherein the electrical contact extends through an opening in the housing cover in a region of the separating joint.

8. The motor vehicle lock according to claim 7, wherein the opening extends at least in some regions in a direction of an outer surface of the lock housing.

9. The motor vehicle lock according to claim 7, wherein the opening is filled by a sealing compound.

10. The motor vehicle lock accordingly to claim 7, wherein the opening is accessible from an outer surface of the motor vehicle lock and the housing cover when the motor vehicle lock is in a closed state.

11. The motor vehicle lock according to claim 1, further comprising a resilient second seal arranged in the housing cover, and the electrical contact extends through the second seal.

12. The motor vehicle lock according to claim 11, wherein the second seal is arranged in the dry space of the printed circuit board.

13. The motor vehicle lock according to claim 1, wherein the electrical contact is configured as a conductor track.

14. The motor vehicle lock according to claim 13, wherein the conductor track is connected to the printed circuit board by an insulation displacement connection.

15. The motor vehicle lock accordingly to claim 13, wherein the conductor track is configured as a conductor track structure comprising multiple individual electrical contact tracks.

16. The motor vehicle lock accordingly to claim 13, wherein the conductor track includes spring-loaded electrical contacts.

* * * * *